United States Patent [19]

Shedigian

[11] Patent Number: 4,511,949
[45] Date of Patent: Apr. 16, 1985

[54] AROMATIC DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 562,392

[22] Filed: Dec. 19, 1983

[51] Int. Cl.$^3$ .............................................. H01G 4/22
[52] U.S. Cl. .................................................... 361/319
[58] Field of Search .............. 252/567, 570, 575, 581; 585/6.3; 361/314, 315, 318, 319, 323, 324, 327

[56] References Cited

U.S. PATENT DOCUMENTS

| | | | |
|---|---|---|---|
| 3,724,043 | 4/1973 | Eustance | 252/567 X |
| 3,925,221 | 12/1975 | Eustance | 361/319 X |
| 4,054,937 | 10/1977 | Mandelcorn et al. | 361/319 |
| 4,117,579 | 10/1978 | Shaw et al. | 361/319 X |
| 4,287,074 | 9/1981 | Earhart et al. | 585/6.3 |
| 4,348,713 | 9/1982 | Grahame | 361/315 |

*Primary Examiner*—Donald A. Griffin
*Attorney, Agent, or Firm*—Robert F. Meyer

[57] ABSTRACT

A capacitor includes a dielectric separator that includes a polypropylene film, and a dielectric fluid that consists essentially of about 100% by volume of an alkylated biphenyl for enhancing swelling in said film of from about 5% to about 15% by volume dependent on temperature.

4 Claims, 5 Drawing Figures

AROMATIC DIELECTRIC FLUID FOR A CAPACITOR

This invention relates to dielectric fluids for electrical capacitors and more particularly to such fluids that utilize alkylated biphenyls.

In the manufacture of high voltage capacitors, such as those used in refrigerators, microwave ovens, power line transformers, and the like, the selection of the dielectric fluid has a substantial influence on the electrical characteristics of the capacitor. Voltages in such applications are commonly within the range of 50 to 2500 Volts. It is desirable that the dielectric fluid have as high a dielectric constant as practical in order to provide volumetric efficiency in the capacitor. Physically the fluid should have a relatively low viscosity to enable it to permeate the capacitor windings and fill the voids between the electrode and dielectric material. Additionally, the fluid should exhibit excellent swellability of polypropylene films utilized in capacitors as a dielectric in order to decrease the gap between the electrode and dielectric separators, therefore decreasing the distance to be traveled by an ion under stress. This results in a low dissipation factor and an increase in dielectric strength.

For many years, polychlorinated biphenyls, hereinafter PCB's, have been used at least as part of dielectric fluids because of their ability to satisfy some of the above requirements. PCB's have recently been associated with ecological problems, and restrictive use limitations and rising costs have severely prohibited their application in the capacitor field.

Thus, suitable substitutes are desirable to minimize these aforementioned problems.

Therefore, it is an object of the present invention to provide a dielectric fluid that has a suitably high dielectric constant to provide volumetric efficiency within the capacitor.

Further, it is an object of the invention to provide a dielectric fluid with a relatively low viscosity to permit permeation of the capacitor windings in order to fill the voids between the electrodes and the dielectric separator.

It is another object of the invention to provide a dielectric fluid that exhibits superior swellability of polypropylene film in order to minimize the gap between the electrode and dielectric.

A dielectric fluid in accordance with the present invention includes an alkylated biphenyl. Preferably, the alkylated biphenyl is a secondary butyl biphenyl and more particularly is comprised of about 85% mono-sec-butyl biphenyl and about 15% di-sec-butyl biphenyl.

Additionally, a dielectric fluid of the present invention includes an epoxide utilized to clean up thermal, chemical, and electrical decompositions within the capacitor and an anxioxidant, such as butylated hydroxyltoluene (BHT) that acts as a radical scavenger.

Other features and advantages of the present invention will be apparent from the following discription of a preferred embodiment representing the best mode of carrying out the invention as presently perceived, which description should be considered in conjunction with the accompanying drawings, in which.

In the illustrative embodiment, the dielectric fluid of the present invention includes an alkylated biphenyl and more particularly a secondary butyl biphenyl. This particular biphenyl is biodegradable, non-toxic, highly aromatic, with a low freezing point and acceptable flash point, and produces excellent swelling in polypropylene films. The ability of the secondary butyl biphenyl to effectively swell polypropylene film is highly beneficial, particularly in paper polypropylene capacitors.

Figure 1:
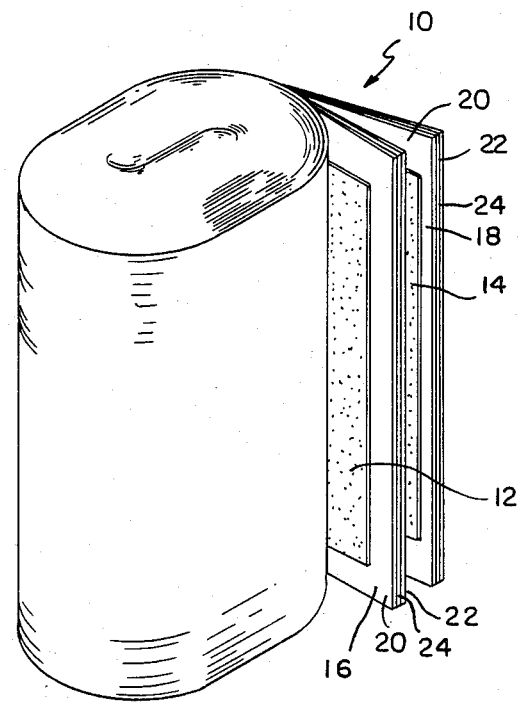
FIG. 1 is a capacitor roll section partially unrolled that utilizes the dielectric fluid of the present invention.

A typical paper polypropylene capacitor is illustrated in FIG. 1. The capacitor body 10 includes a pair of electrodes 12 and 14 which are separated by a pair of dielectric separators 16 and 18. The electrodes 12 and 14 may be made of any suitable electrically conductive metal such as aluminum. The dielectric means, or separators 16 and 18, used in the capacitor include a pair of sheets of plastic film 20 and 22, preferably polypropylene, which are separated by a sheet of paper 24. Alternatively, the plastic film can be selected from the group consisting of polypropylene, polyethylene, polyester, polycarbonate, polystyrene, polysulfone and polyethylene terephthalate. Other suitable arrangements may also be used including the same materials but different combinations of dielectric sheets. Examples are a combination of single sheets of paper and plastic film or the combination of two sheets of paper and a single sheet of plastic film. By producing a high swellability within the film, the space factor (gap) between the electrode and dielectric decreases, and therefore the conductive ions have less distance to travel when imposed to stress resulting in a very low dissipation factor. Additionally, the dielectric strength of the fluid also increases.

Unexpectedly, the secondary butyl biphenyl was able to swell polypropylene film to a much higher degree in comparison to the currently popular dielectric fluid dioctyl phthalate (DOP). A secondary butyl biphenyl can be obtained from Sun Oil Company under product name Sure Sol-290 (see U.S. Pat. No. 4,287,074). This particular secondary butyl biphenyl is made up of substantially 80% to 85% by weight mono-sec-butyl biphenyl and about 10% to 20% di-sec-butyl biphenyl. This fluid is purified with fuller's earth in order to remove any moisture, conductive ions, and any other impurities. An epoxide such as ERL-4221 manufactured by Union Carbide Corp. is added to the secondary butyl biphenyl to facilitate in the cleanup of thermal, chemical, and electrical decomposition within the capacitor upon insertion of the dielectric fluid. Additionally, an antioxidant such as butylated hydroxytoluene (BHT) is added to act as a radical scavenger.

It was determined that the preferrable percentage of the constituents in the dielectric fluid are approximately 100% by volume secondary butyl biphenyl, about 0.64% by weight epoxy, and about 0.1% by weight butylated hydroxytoluene.

Figure 2:
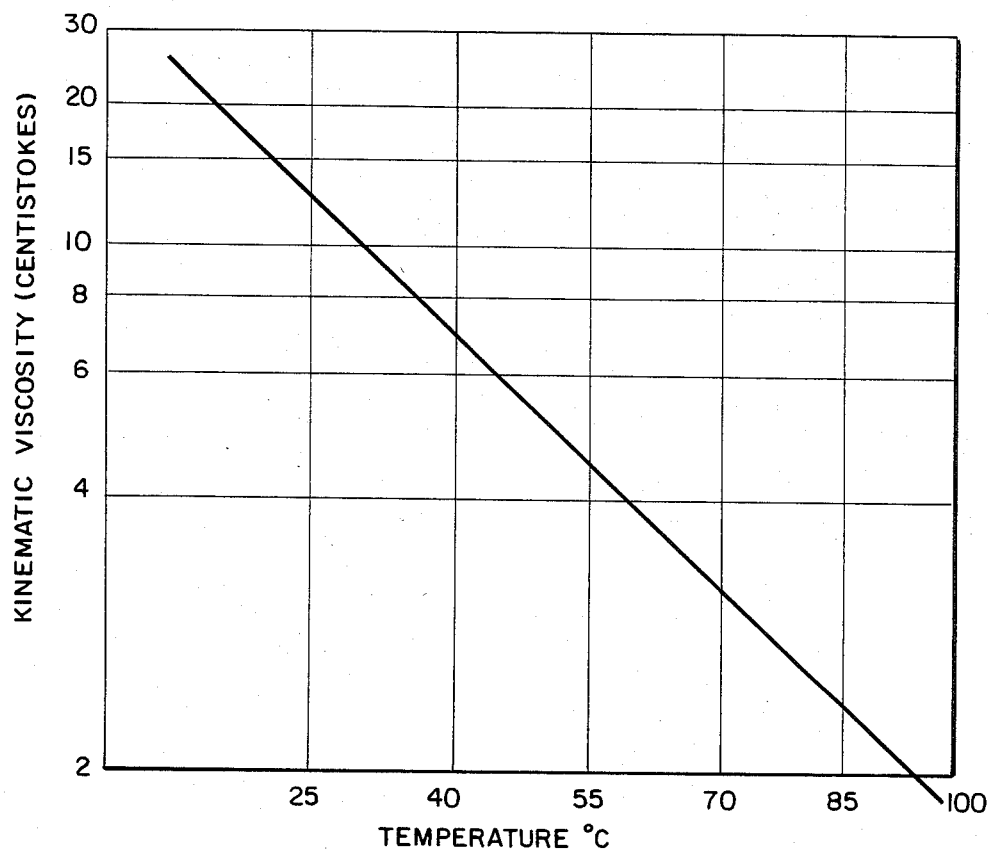
FIG. 2 is a graphic representation of the viscosity of a dielectric fluid of the present invention vs. temperature.
Figure 3:
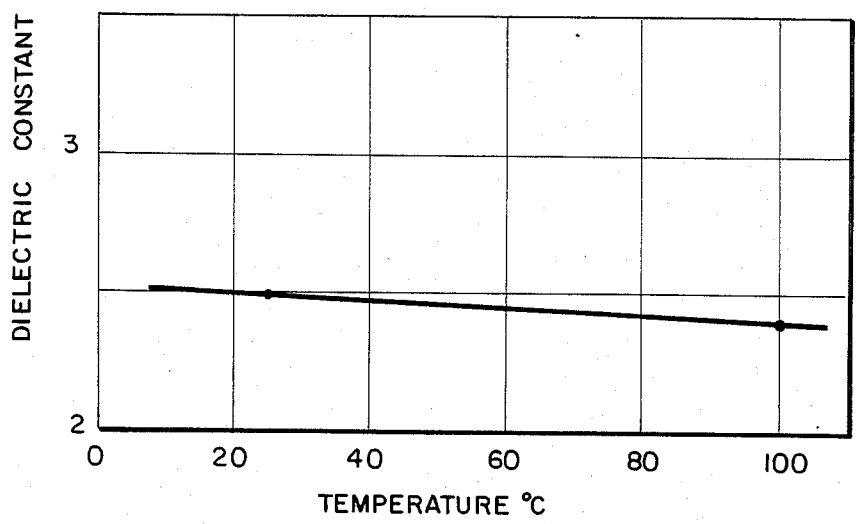
FIG. 3 is a graphic representation of the dielectric constant of a dielectric fluid of the present invention vs. temperature.
Figure 4:
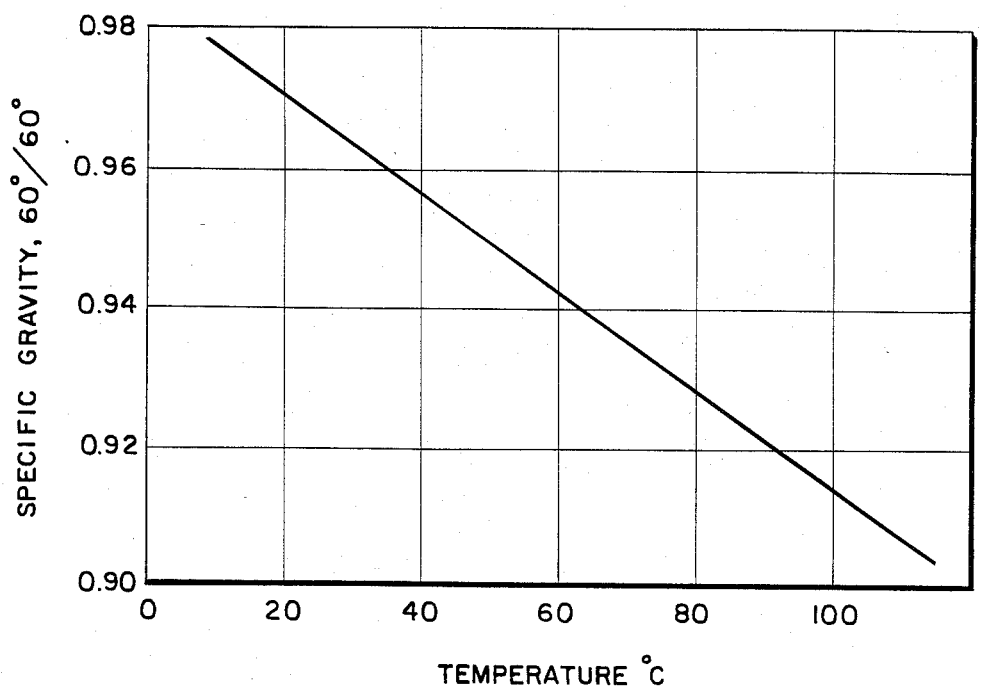
FIG. 4 is a graphic representation of the specific gravity of a dielectric fluid of the present invention vs. temperature; and, FIG. 5 is a graphic representation of the percent dissipation factor of a dielectric fluid of the present invention vs. temperature.

A number of paper-polypropylene film capacitors rated at 660 VAC/4uF were impregnated with a dielectric fluid made in accordance with a preferred embodiment of the present invention. The physical and electrical properties of the capacitors manufactured with the dielectric fluid of the present invention are shown in Table I. Additionally, the viscosity, dielectric constant, and the specific gravity of the dielectric fluid were measured at both 25° C. and 100° C. The change in viscosity, dielectric constant, and specific gravity with respect to temperature are illustrated in FIGS. 2, 3, and 4.

TABLE I

PHYSICAL AND ELECTRICAL PROPERTIES OF SECONDARY BUTYL BIPHENYL - SURE SOL-290

| | | |
|---|---|---|
| Viscosity - CS | 25° C. | 12.5 |
| | 100° C. | 1.7 |
| Dielectric Constant | 25° C. | 2.5 |
| | 100° C. | 2.4 |
| Specific Gravity 60°/60° | 25° C. | 0.967 |
| | 100° C. | 0.914 |
| Dielectric Strength, KV | | 45 |
| Flash Point, COC-°C. | | 150 |
| Freezing Point, °C. | | >−45 |
| Aromaticity, % | | 75 |

Figure 5:
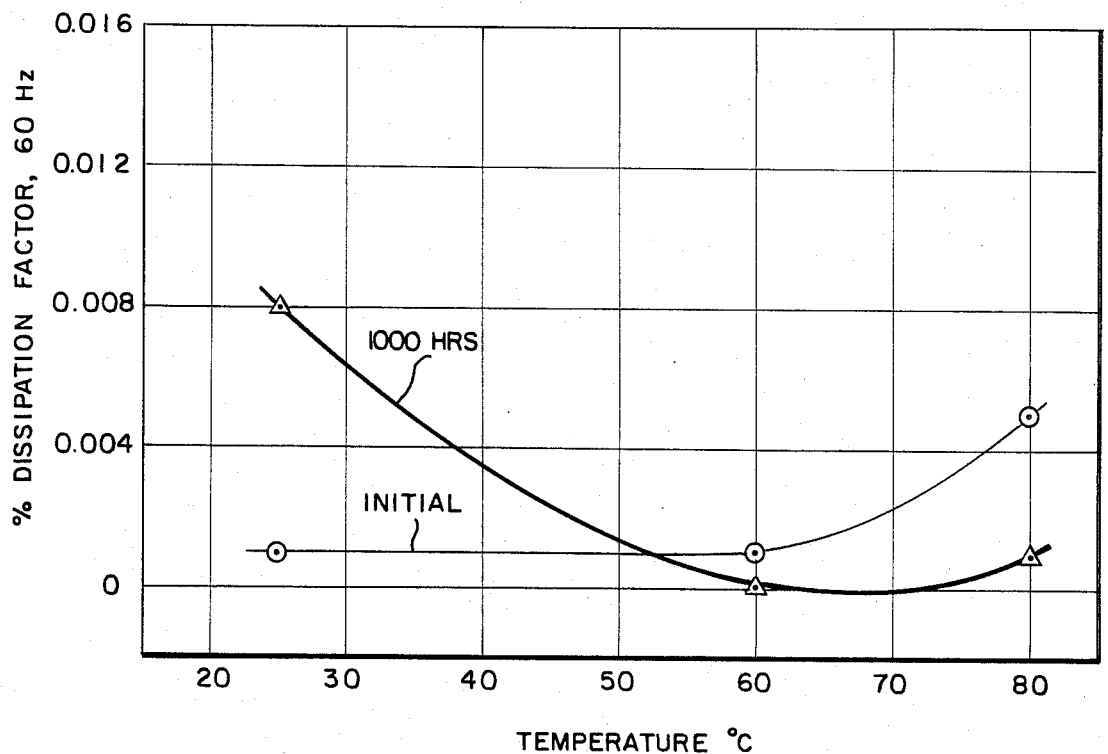

Further, these capacitors were life-tested at levels 25% above design stress at 80° C. The life-test capacitors were tested for both capacitance and percent dissipation initially and at 1000 hours at 25° C., 60° C., and 80° C. The results of the tests are shown in Table II. FIG. 5 is a graphic representation of the percent dissipation of the life test capacitors vs. temperature.

TABLE II

ELECTRICAL CAPACITOR PROPERTIES
Capacitance and % Dissipation Factor Stability During Life Test - 660 VAC/4 uF Capacitors on 930 VAC, 80° C. Life Test
Dielectric 1 = 0.50 MILS PP Film + 1 × 0.35 MILS Paper

| | Initial | 1000 Hrs. |
|---|---|---|
| Capacitance uF | | |
| 25° C. | 4.113 | 4.122 |
| 60° C. | 4.056 | 4.065 |
| 80° C. | 4.038 | 4.039 |
| % Dissipation Factor | | |
| 25° C. | 0.001 | 0.008 |
| 60° C. | 0.001 | 0.000 |
| 80° C. | 0.005 | 0.001 |

These tests were repeated for capacitors rated 660 VAC/15uF on a 800 VAC, 80° C. life test and for capacitors rated 660 VAC/20uF on a 760 VAC, 80° C. life test. The results of these tests are shown in Table II(a):

TABLE II(a)

| | Initial | 1000 Hrs. |
|---|---|---|
| 660 VAC/15 uF Capacitors ON 800-VAC, 80° C. Life Test | | |
| Capacitance uF | | |
| 25° C. | 15.403 | 15.381 |
| 60° C. | 15.247 | 15.118 |
| 80° C. | 15.112 | 15.084 |
| % Dissipation Factor | | |
| 25° C. | 0.012 | 0.001 |
| 60° C. | 0.001 | 0.000 |
| 80° C. | 0.001 | 0.000 |
| 660 VAC/20 uF Capacitors on 760 VAC, 80° C. On Life Test | | |
| Capacitance uF | | |
| 25° C. | 20.775 | 20.778 |
| 60° C. | 20.591 | 20.443 |
| 80° C. | 20.418 | 20.412 |
| % Dissipation Factor | | |
| 25° C. | 0.005 | 0.001 |
| 60° C. | 0.001 | 0.000 |
| 80° C. | 0.012 | 0.000 |

Additionally, the percent swellability of a polypropylene film was measured in a dielectric solution of the present invention and in dioctyl phthalate (DOP) at 25° C., 60° C., and 95° C. In comparison to DOP, Sure Sol-290 enhanced swellability of the polypropylene film by about 5% to about 15% by volume dependent on temperature. The result of these tests are shown in Table III.

TABLE III

% SWELLABILITY OF POLYPROPYLENE FILM IN SECONDARY BUTYL BIPHENYL - SURE SOL-290

| | 25° C. | 60° C. | 95° C. |
|---|---|---|---|
| Sure Sol-290 | 7.0 | 9.2 | 14.2 |
| Dioctyl Phthalate (DOP) | 0.4 | 4.0 | 7.0 |

All of the results indicate that the dielectric fluid of the present invention functions as a highly satisfactory substitute for both phthalate ester and for polychlorinated biphenyls.

It should be noted that the dielectric fluid of the present invention swelled the polypropylene film to a far greater degree than was achieved with the currently popular dielectric fluid dioctyl phthalate. Because of this greater increase in swellability, and the resulting decrease in the space factor (gap) between the electrode and dielectric, a low dissipation factor was exhibited by the capacitors manufactured utilizing the dielectric fluid of the present invention. Because of the enhanced swelling of the film and the significant decrease in gap size, there was a resulting decrease in capacitor failure due to arcing in the capacitor caused by gap size.

The above description of the present invention is intended to be taken in an illustrated and not a limiting sense, and various modifications and changes may be made to the described embodiments by a person skilled in the art without departing from the scope of the appended claims.

What is claimed is:

1. In a capacitor having dielectric means for separating electrodes that includes a polypropylene film, a dielectric fluid consisting essentially of about 100% by volume of an alkylated biphenyl for enhancing swelling in said film of from about 5% to about 15% by volume dependent on temperature, an epoxide for the cleaning up of thermal, chemical, and electrical decomposition within the capacitor, and an antioxidant of butylated hydroxytoluene.

2. The capacitor of claim 1 wherein the alkylated biphenyl is a secondary butyl biphenyl.

3. The capacitor of claim 2 wherein the secondary butyl biphenyl consists essentially of about 82% to about 88% by weight mono-sec-butyl biphenyl and from 12% to about 18% di-sec-butyl biphenyl.

4. The capacitor of claim 1 wherein the dielectric fluid further consists of about 0.64% by weight of epoxide and about 0.01% by weight of butylated hydroxytoluene.

* * * * *